US007074862B2

(12) United States Patent
Kaspar et al.

(10) Patent No.: US 7,074,862 B2
(45) Date of Patent: Jul. 11, 2006

(54) EMULSIFIER FREE AQUEOUS EMULSION POLYMERIZATION PROCESS FOR MAKING FLUOROPOLYMERS

(75) Inventors: Harald Kaspar, Burgkirchen (DE); Klaus Hintzer, Kastl (DE); Greta Dewitte, Beveren (BE); Werner Schwertfeger, Altotting (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/474,523

(22) PCT Filed: Apr. 30, 2002

(86) PCT No.: PCT/US02/13691

§ 371 (c)(1),
(2), (4) Date: Oct. 9, 2003

(87) PCT Pub. No.: WO02/088207

PCT Pub. Date: Nov. 7, 2002

(65) Prior Publication Data

US 2004/0132939 A1   Jul. 8, 2004

Related U.S. Application Data

(60) Provisional application No. 60/288,172, filed on May 2, 2001.

(51) Int. Cl.
*C08F 214/16* (2006.01)
(52) U.S. Cl. .................. 526/89; 526/250; 526/255
(58) Field of Classification Search ................ 526/89, 526/250, 255
See application file for complete search history.

(56) References Cited

U.S. PATENT DOCUMENTS

| 3,051,677 A | 8/1962 | Rexford |
| 3,069,401 A | 12/1962 | Gallagher |
| 3,467,636 A | 9/1969 | Nersasian |
| 3,632,847 A | 1/1972 | Hartwimmer |
| 3,635,926 A | 1/1972 | Gresham et al. |
| 3,642,742 A | 2/1972 | Carlson |
| 3,839,305 A | 10/1974 | Moore |
| 3,855,191 A | 12/1974 | Doughty, Jr. et al. |
| 3,876,654 A | 4/1975 | Pattison |
| 4,233,421 A | 11/1980 | Worm |
| 4,262,101 A * | 4/1981 | Hartwimmer et al. ........ 526/89 |
| 4,316,836 A | 2/1982 | Aufdermarsh, Jr. |
| 4,439,385 A | 3/1984 | Kuhls et al. |
| 4,564,662 A | 1/1986 | Albin |
| 4,588,796 A | 5/1986 | Wheland |
| 4,861,845 A | 8/1989 | Slocum et al. |
| 4,912,171 A | 3/1990 | Grootaert et al. |
| 5,086,123 A | 2/1992 | Guenthner et al. |
| 5,106,911 A | 4/1992 | Chapman, Jr. et al. |
| 5,153,286 A | 10/1992 | Mayo et al. |
| 5,208,305 A * | 5/1993 | Grootaert ..................... 526/194 |
| 5,256,745 A | 10/1993 | Grootaert |
| 5,260,393 A | 11/1993 | Arcella et al. |
| 5,262,490 A | 11/1993 | Kolb et al. |
| 5,453,477 A * | 9/1995 | Oxenrider et al. .......... 526/230 |
| 5,464,904 A | 11/1995 | Chapman, Jr. et al. |
| 5,530,077 A | 6/1996 | DeSimone et al. |
| 5,530,078 A | 6/1996 | Felix et al. |
| 5,565,512 A | 10/1996 | Saito et al. |
| 5,591,804 A | 1/1997 | Coggio et al. |
| 5,663,255 A | 9/1997 | Anolick et al. |
| 5,668,221 A | 9/1997 | Saito et al. |
| 5,677,389 A | 10/1997 | Logothetis et al. |
| 5,710,217 A | 1/1998 | Blong et al. |
| 5,824,726 A | 10/1998 | DeSimone et al. |
| 5,929,169 A | 7/1999 | Jing et al. |
| 5,955,556 A * | 9/1999 | McCarthy et al. .......... 526/249 |
| 6,399,729 B1 | 6/2002 | Farnham et al. |
| 6,693,152 B1 * | 2/2004 | Kaspar et al. ................. 526/78 |
| 6,706,819 B1 * | 3/2004 | Araki et al. ................. 525/199 |

FOREIGN PATENT DOCUMENTS

| EP | 0 661 304 A1 | 7/1995 |
| EP | 0 769 521 A1 | 4/1997 |
| EP | 0 784 064 A1 | 7/1997 |
| EP | 0 964 009 A1 | 12/1999 |
| EP | 1 193 275 A1 | 4/2002 |
| JP | 71011031 | 12/1971 |
| WO | WO 96/24622 | 8/1996 |
| WO | WO 97/17381 | 5/1997 |
| WO | WO 00/09603 | 2/2000 |
| WO | WO 00/32655 | 6/2000 |

OTHER PUBLICATIONS

Co-Pending Application, U.S. Appl. No. 09/495,600, Filed Feb. 1, 2000, Now Allowed.
*Modern Fluoropolymers*, edited by John Scheirs, Wiley Science, 1997, pp. 377-378.
*Journal of Applied Polymer Science*, vol. 70, No. 11, T.F. McCarthy et al, "Surfactant-Free Emulsion Polymerization of Chlorotrifluoroethylene With Vinylacetate or Vinylidene Fluoride", 1998, John Wiley & Sons, Inc., New York, NY, pp. 2211-2225.

* cited by examiner

*Primary Examiner*—David W. Wu
*Assistant Examiner*—Henry S. Hu
(74) *Attorney, Agent, or Firm*—Brian E. Szymanski; C. Michael Geise

(57) ABSTRACT

Emulsifier free fluoropolymer manufacturing method in which (a) a chain transfer agent, or a mixture of chain transfer agents are used wherein the chain transfer agents do not yield more than 0.4 weight % relative to the monomer feed of water soluble fluorinated compounds, or (b) a chain transfer agent or a mixture of chain transfer agents selected from alkanes, dialkyl ethers, hydrofluoroethers and/or hydrofluorocarbons.

19 Claims, No Drawings

EMULSIFIER FREE AQUEOUS EMULSION POLYMERIZATION PROCESS FOR MAKING FLUOROPOLYMERS

This application claims priority to PCT/US02/14691 which claims the benefit of U.S. Provisional Application No. 60/288,272, both herein incorporated by reference in their entirety.

FIELD OF THE INVENTION

The present invention relates to the aqueous emulsion polymerization of fluorinated monomers to produce specific fluoropolymers, in particular to produce fluorothermoplasts or fluoroelastomers. Specifically, the present invention relates to an improvement in the aqueous emulsion polymerization of fluorinated monomers wherein no emulsifier is added.

BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc. . . . The various fluoropolymers are for example described in "Modern Fluoropolymers", edited by John Scheirs, Wiley Science 1997.

The known fluoropolymers include in particular fluoroelastomers and fluorothermoplasts. Such fluoropolymers are generally copolymers of a gaseous fluorinated olefin such as tetrafluoroethylene (TFE), chlorotrifluoroethylene (CTFE) and/or vinylidene fluoride (VDF) with one or more comonomers such as for example hexafluoropropylene (HFP) or perfluorovinyl ethers (PVE) or non-fluorinated olefins such as ethylene (E) and propylene (P).

Examples of fluoroelastomers include for example copolymers of TFE and PVE and copolymers of VDF and HFP. The fluoroelastomers may also contain cure site components so that they may be cured if desired. Applications of fluoroelastomers include for example coatings, use as gaskets and seals as well as use as polymer processing aids (PPA). A commercially available processing aid includes for example copolymers of VDF and HFP available from Dyneon LLC under the brand DYNAMAR™ PPA.

Examples of fluorothermoplasts include semicrystalline copolymers of TFE and E (ETFE), copolymers of TFE and HFP (FEP), copolymers of TFE, HFP and VDF (THV) and perfluoroalkoxy copolymers (PFA). Examples of applications of fluorothermoplasts include for example coating applications such as for example for coating outdoor fabric and use as insulating material in wire and cable insulation. In particular ETFE copolymers have desirable properties as insulating material. Further applications of fluorothermoplasts include making of tubes such as for example fuel hoses, extrusion of films and injection molded articles. The extruded fluorothermoplastic articles, in particular films may further be subjected to an e-beam radiation to partially cure the fluorothermoplast.

Several methods are known to produce the fluoropolymers. Such methods include suspension polymerization as disclosed in e.g. U.S. Pat. Nos. 3,855,191, 4,439,385 and EP 649863; aqueous emulsion polymerization as disclosed in e.g. U.S. Pat. Nos. 3,635,926 and 4,262,101; solution polymerization as disclosed in U.S. Pat. Nos. 3,642,742, 4,588, 796 and 5,663,255; polymerization using supercritical $CO_2$ as disclosed in JP 46011031 and EP 964009 and polymerization in the gas phase as disclosed in U.S. Pat. No. 4,861,845.

Currently, the most commonly employed polymerization methods include suspension polymerization and especially aqueous emulsion polymerization. The aqueous emulsion polymerization normally involves the polymerization in the presence of a fluorinated surfactant, which is generally used for the stabilization of the polymer particles formed. The suspension polymerization generally does not involve the use of surfactant but results in substantially larger polymer particles than in case of the aqueous emulsion polymerization. Thus, the polymer particles in case of suspension polymerization will quickly settle out whereas in case of dispersions obtained in emulsion polymerization generally good stability over a long period of time is obtained.

An aqueous emulsion polymerization wherein no surfactant is used has been described in U.S. Pat. No. 5,453,477, WO 96/24622 and WO 97/17381 to generally produce homo- and copolymers of chlorotrifluoroethylene (CTFE). For example, WO 97/17381 discloses an aqueous emulsion polymerization in the absence of a surfactant wherein a radical initiator system of a reducing agent and oxidizing agent is used to initiate the polymerization and whereby the initiator system is added in one or more further charges during the polymerization. However, the aqueous emulsion polymerization process disclosed there has the disadvantage that a dual feed of reducing agent and oxidizing agent is required, making the process more cumbersome. This means in practice, for example, that additional feeding lines and control devices are needed and the dual feed inevitably increases the risk of failures during the polymerization. More importantly, WO 97/17381 mainly relates to the control of the latex particles size as well to the particle size distribution in the absence of fluorinated emulsifier, the control of the molecular weight as well as the molecular weight distribution (MWD) is not concerned herein. WO 97/17831 also discloses the optional use of chain transfer agents and discloses in one of the examples an aqueous emulsion polymerization process using ethyl acetate as a chain transfer agent. It was however found that the use of ethyl acetate results in the formation of water-soluble fluorinated substances, which is undesirable.

The aqueous emulsion polymerization process in the presence of fluorinated surfactants is a desirable process to produce fluoropolymers because it can yield stable fluoropolymer particle dispersions in high yield and in a more environmental friendly way than for example polymerizations conducted in an organic solvent. However, for certain applications, the fluoropolymers produced via the aqueous emulsion polymerization process may have undesirable properties relative to similar polymers produced via solution polymerization. For example, purity is required for polymers used in applications with food contact, and in particular the presence of extractables (e.g., fluorinated surfactants and other low molecular weight fluorinated compounds) is highly regulated. Furthermore, fluorinated surfactants typically used in aqueous emulsion polymerization such as perfluoro octanoic acid or perfluoro sulfonic acids are expensive and are considered as environmental concern nowadays. It is therefore desirable to run aqueous emulsion polymerizations in the absence of surfactants without however compromising the properties of the polymers resulting.

It would also be desirable to improve the aqueous emulsion polymerization process so that also fluoropolymers of higher quality can be produced meeting the needs of demanding applications. In particular, it would be desirable to improve properties such as the mechanical and physical properties of the resulting polymer, the purity level, reducing the amount of extractable substances, reduce discoloration, improved processability and improving performance of the fluoropolymer such as for example the compression set and permeation in case of a curable fluoroelastomer.

3. SUMMARY OF THE INVENTION

The present invention provides a method of making a fluoropolymer comprising repeating units derived from at least one first and at least one second monomer that are different from each other. The fluoropolymers are thus copolymers. The term copolymer in connection with the present invention includes binary copolymers, i.e. copolymers of only two different monomers, as well as copolymers that comprise more than two different monomers such as terpolymers and quaterpolymers. The fluoropolymers may have a partially or fully fluorinated backbone. In one aspect of the invention, the first monomer is a fluoroolefin selected from tetrafluoroethylene (TFE) and vinylidene fluoride (VDF) and the second monomer is at least one comonomer selected from the group consisting of a perfluoroalkyl vinyl monomer such as hexafluoropropylene (HFP), ethylene, propylene, fluorinated allyl ethers and fluorinated vinyl ethers, in particular perfluorovinyl ethers (PVE), vinylfluoride and vinylidene fluoride (VDF). Additional monomers may be present as well such as for example chlorinated monomers including chlorotrifluoroethylene. The method comprises an aqueous emulsion polymerization of the first and second monomers in absence of added surfactant (hereinafter also referred to as emulsifier free polymerization) in the presence of a chain transfer agent that under the conditions of polymerization does not produce more than 0.4% by weight of water soluble fluorinated substances, preferably not more than 0.2%. The weight percentage is relative to the total weight of monomers fed to the polymerization. In a particular aspect of this invention, the chain transfer is selected from the group consisting of alkanes, dialkyl ethers, hydrofluoroethers and/or hydrofluorocarbons.

By the term "in absence of added surfactant" is meant that no surfactant is added to the polymerization system.

The method of the present invention has the advantage that it is more easy and convenient to practice than methods of the prior art while still allowing production of the fluoropolymner in high yield and high polymerization rates. Accordingly, the process of the present invention is easy, convenient and cost effective. Furthermore, the resulting polymer dispersions have good latex stability (that means the latex does not settle quickly or coagulate) despite the fact that the average particle size of the polymers may be as large as 500 nm. Additionally, the fluoropolymers produced with the process of the invention, have a higher purity and less extractable substances and generally yield fluoropolymers that have similar or even improved properties compared to like polymers produced in the presence of added fluorinated surfactant. Furthermore, polymer dispersions are obtained that are environmentally friendly.

Additionally, it has been found that the emulsifier free polymerization method of this invention can be used to produce fluoropolymers that have a multi-modal, e.g., a bimodal, molecular weight distribution in a single step polymerization. By single step polymerization is meant that the polymerization can be carried out without having to interrupt the reaction as has been practiced in the prior art. Such polymerization creating a multi-modal molecular weight distribution, are typically carried out in the presence of chain transfer agents.

4. DETAILED DESCRIPTION OF THE INVENTION

The present invention relates to the making of fluoropolymers that comprise repeating units derived from a fluoroolefin selected from the group consisting of TFE and/or VDF and repeating units derived from at least one comonomer selected from the group consisting of E, P, perfluoro alkyl vinyl monomers such as e.g. hexafluoropropylene (HFP), fluorinated allyl ethers and fluorinated vinyl ethers, in particular PVE, vinylidene fluoride and vinylfluoride. It will be clear that in case VDF is selected as the only fluoroolefin, the comonomer should be other than VDF so as to achieve a copolymer.

Examples of suitable PVE monomers include those corresponding to the formula:

wherein $R_f$ represents a perfluorinated aliphatic group that may contain one or more oxygen atoms. Preferably, the perfluorovinyl ethers correspond to the general formula:

wherein $R_f$ and $R'_f$ are different linear or branched perfluoroalkylene groups of 2–6 carbon atoms, m and n are independently 0–10, and $R''_f$ is a perfluoroalkyl group of 1–6 carbon atoms. Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and

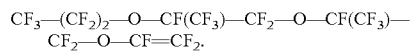

Suitable fluoroalkane monomers correspond to the general formula:

or

wherein $R^d_f$ represents a perfluoroalkyl group of 1 to 10, preferably 1 to 5 carbon atoms. A typical example is hexafluoropropylene.

The fluoropolymers are produced according to an aqueous emulsion polymerization process in the absence of the addition of an emulsifier. Despite the fact that no emulsifier is added, stable polymer dispersions are produced.

The initiator system used in the aqueous emulsion polymerization process of the present invention includes a redox system of an oxidizing agent and a reducing agent. Suitable oxidizing agents include persulfates including for example ammonium persulfate, (APS) potassium persulfate (KPS) and sodium persulfate, preferably APS or KPS. Suitable reducing agents include sulfites, such as sodium sulfite, sodium bisulfite, a metabisulfite such as sodium or potassium bisulfite, pyrosulfites and thiosulfates, preferably $Na_2S_2O_5$, metal ions such as cupper, iron, silver. Other redox systems can be used as well to initiate the polymerization although the aforementioned redox couples are preferred for use with this invention as they generally yield more stable latices.

According to a further embodiment, involving a fluoroolefin such as tetrafluoroethylene and/or vinylidenefluoride, oxidizing metal-ions, such as those deriving from potassium permanganate, $Mn^{3+}$-salts (like manganese triacetate, manganese oxalate, etc.), potassium per-rheanate, $Ce^{4+}$-salts, etc. are used to initiate the polymerization. The preferred metal salt is $KMnO_4$. For example, a polymerization of tetrafluoroethylene and further comonomers as disclosed above may be initiated by adding thereto potassium permanganate. During the polymerization potassium permanganate is typically further added in one or more portions or continuously. Tetrafluoroethylene and the other comonomers may be further added as well during the polymerization. The benefit of such an initiator system is that only an oxidizing agent (e.g. $KMnO_4$) is added to initiate the polymerization and to continue the polymerization. In certain cases a complexing agent (e.g. oxalic acid, or salts thereof) might be added to avoid precipitation of the active metal complexes, but this is not a necessity.

Still further, the polymerization may be initiated with an initiator that decomposes thermally such as a persulfate. Thus, a persulfate can also be used on its own without presence of a reducing agent.

The chain transfer agent used in the polymerization is selected such that under the polymerization conditions, the amount of water soluble fluorinated compounds that are produced is not more than 0.4%, preferably not more than 0.2% based on the total weight of monomers fed to the polymerization. Without intending to be bound by theory, it is believed that chain transfer agents that have a high affinity for the fluoropolymer that is being produced, will typically result in large amounts of water soluble fluorinated compounds. Chain transfer agents that have a high affinity for the fluoropolymer are typically those that are either capable of dissolving the fluoropolymer or substantially swell the fluoropolymer.

Chain transfer agents that have been found to yield no or only small amounts of water-soluble fluorinated compounds include those selected from the group consisting of dialkyl ethers, hydrofluoroethers, alkanes in particular those having 1 to 5 carbon atoms and hydrofluorocarbon compounds. Preferably, the chain transfer agent is an alkane or a dialkyl ether. Examples of dialkyl ethers include dimethyl ether, diethyl ether and methyl t-butyl ether. Examples of alkanes include methane, ethane, propane, butane and n-pentane. Suitable hydrofluoroethers include those which have been disclosed in WO 00/32655. These hydrofluoroethers correspond to the formula $R_1$—O—$R_2$ wherein $R^1$ is a straight chain or branched saturated hydrocarbon group of 1 to 6 carbon atoms with the proviso that at least one hydrogen atom is attached to the carbon atom next to oxygen, and $R^2$ is a straight chain or branched fluorocarbon group or hydrofluorocarbon group of formula $C_aH_bF_c$ with a being 2 to 6, b being 0 to 2a−1 and c being 2 to 2a+1 and with the proviso that b+c is 2a+1. Examples of hydrofluoroethers include in particular methoxy nonatluorobutane and ethoxy nonafluorobutane which are both commercially available from 3M Company. Suitable hydrofluoroethers may also be represented by the formula $R_f$—O—$CH_3$, whereby $R_f$ can be a linear or branched partially fluorinated or perfluorinated rest of $C_1$-$C_{10}$. Suitable hydrofluorocarbons include compounds consisting of hydrogen and carbon that are either liquid or gaseous under ambient conditions of pressure and temperature.

The amount of chain transfer agent used is generally selected to obtain the desired molecular weight and is typically between 0.1 and 100 parts per thousand. The parts per thousand is based on the total weight of monomers fed to the polymerization reaction. The chain transfer agent concentration, e.g. dialkyl ether, may also be varied throughout the polymerisation to influence the molecular weight distribution, i.e. to obtain a broad molecular weight distribution or to obtain a bimodal distribution.

It has been found that the dialkyl ether chain transfer agents are particularly suitable for use in the emulsifier free polymerization as they effectively control the molecular weight without substantially affecting the emulsifier free polymerization process. Accordingly, the fluoropolymer of desired molecular weight can be obtained in a convenient and fast way and at high yield. Further, the dialkyl ether chain transfer agent—preferrably dimethyl ether or methyl t-butyl ether—can produce very pure fluoropolymers that have a low amount of extractable compounds. Surprisingly, it has been found that the utilisation of dialkyl ether chain transfer agents greatly reduces the generation of low molecular weight fluorinated oligomers (e.g. of the general structure $TFE_n/HFP_m/VDF_o$—$COO^\ominus$). These low molecular weight oligomers are water soluble and they are undesirable because of environmental aspects. Additionally, the polymers so produced will generally be less susceptible to discoloration. Dialkyl ether chain transfer agents are preferably used to produce fluoropolymers that have a partially fluorinated backbone with a fluorine content of less than about 70%.

For producing fluoropolymers that have a partially fluorinated backbone with a fluorine content of higher than about 70% or that have a perfluorinated backbone, the aqueous emulsion polymerization process of the present invention preferably involves the use of lower alkanes (1 to 5 carbon atoms) such as for example methane, ethane, propane or n-pentane or hydrofluorocarbon compounds such as $CH_2F$—$CF_3$ (R134a) to control the molecular weight of the fluoropolymer.

It has further been found that the emulsifier free polymerization method can be used to produce multi-modal fluoropolymers, preferably fluoropolymers with bimodal molecular weight distribution, in a single-pot polymerization. Such polymers are produced preferably at a given generally constant temperature in the presence of the chain transfer agent or mixture thereof depending on the nature of the desired fluoropolymer.

Such multi-modal fluoropolymers may be produced by charging no or small initial amounts of chain transfer agent at the beginning of the polymerization and one or more further charges of chain transfer agent during the polymerization.

Such processes to produce multi-modal fluoropolymers are less cumbersome than producing multi-modal fluoropolymers by changing the polymerization temperature during the course of the polymerization as is known in the prior art. The multi-modal fluoropolymers typically have processing advantages and low levels of extractables. The aqueous emulsion polymerization process is otherwise generally conducted in the commonly known manner.

Any quantity of the fluoroolefin(s) and comonomer(s) may be charged to the reactor vessel. The monomers may be charged batchwise or in a continuous or semicontinuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, i.e. conversion of monomer into polymer.

The reaction kettle is charged with water, the amounts of which are not critical. Generally, after an initial charge of monomer, the initiator system is added to the aqueous phase to initiate the polymerization. If a mixture of oxidizing agent and reducing agent is used as the initiator system, either of the oxidizing agent or reducing agent may be added first to the aqueous phase followed by the addition of the other agent of the redox system. The initial amount of the initiator system (for example combined amount of oxidizing and reducing agent or a persulfate on its own) added is typically between 0.01 and 0.2% by weight, preferably between 0.02 and 0.12% by weight based on the total amount of polymer dispersion produced. The molar ratio of reducing agent to oxidizing agent in the initial charge is generally between $\frac{1}{20}$ and $\frac{1}{2}$, preferably between $\frac{1}{10}$ and $\frac{1}{4}$. During the polymerization reaction, further amounts of either the reducing agent or oxidizing agent may be added. The further addition of reducing agent or oxidizing agent during the polymerization may be carried out as a continuous feed or in separate discrete charges. If for instance the reducing agent is continuously charged into the vessel throughout the polymerization, the feeding rate typically chosen will ensure that an equimolar amount of oxidizing agent to reducing agent is attained after six hours polymerization time. Accelerators such as for example water soluble salts of iron, copper and silver may preferably be added.

In cases where only an oxidizing metal complex, (e.g. $KMnO_4$) is used as part of the initiator system; the amount of initiator continuously added throughout the polymerization is typically between 0.001 and 0.3% by weight, preferably between 0.005 and 0.1% by weight based on the total amount of polymer dispersion produced.

During the initiation of the polymerization reaction, the sealed reactor kettle and its contents are pre-heated to the reaction temperature. Preferred polymerization temperatures are 10 to 100° C., preferably 30° C. to 80° C. and the pressure is typically between 2 and 30 bar, in particular 5 to 20 bar. The reaction temperature may be varied to influence the molecular weight distribution, i.e. to obtain a broad molecular weight distribution or to obtain a bimodal distribution.

The initial temperature to start the polymerization can be set higher, for example 10° C. to 50° C. higher, than during the rest of the polymerization to ensure a fast initiation rate; the time for this initiation period where the polymerization is carried at a higher temperature can be from 5 min to 60 min from the start of the polymerization reaction. The use of a higher temperature during an initial period may be beneficial for both the redox-system comprising an oxidizing and reducing agent as well as for the initiation system based on an oxidizing metal ion.

The aqueous emulsion polymerization system may further comprise auxiliaries, such as buffers and, if desired complex-formers.

The amount of polymer solids that can be obtained at the end of the polymerization is typically between 10% and 45% and the average particle size of the resulting fluoropolymer is typically between 200 nm and 500 nm.

Examples of fluoropolymers that are preferably produced with the process of the invention include a copolymer of vinylidene fluoride and hexafluoropropylene, a copolymer of tetrafluoroethylene and vinylidene fluoride, a copolymer of tetrafluoroethylene and propylene, a copolymer of tetrafluoroethylene and perfluorovinyl ether (e.g. PMVE, PPVE-1, PPVE-2 or a combination of PPVE-1 and PPVE-2), a copolymer of vinylidene fluoride and perfluorovinyl ether (e.g. PMVE, PPVE-1, PPVE-2 or a combination of PPVE-1 and PPVE-2), a copolymer of tetrafluoroethylene, ethylene or propylene and perfluorovinyl ether (e.g. PMVE, PPVE-1, PPVE-2 or a combination of PPVE-1 and PPVE-2), a copolymer of tetrafluoroethylene, hexafluoropropylene and perfluorovinyl ether (e.g. PMVE, PPVE-1, PPVE-2 or a combination of PPVE-1 and PPVE-2), a copolymer of tetrafluoroethylene, vinylidene fluoride and hexafluoropropylene and optionally CTFE, a copolymer of vinylidene fluoride, tetrafluoroethylene and perfluorovinyl ether (e.g. PMVE, PPVE-1, PPVE-2 or a combination of PPVE-1 and PPVE-2) and a copolymer of a copolymer of tetrafluoroethylene, ethylene or propylene, hexafluoropropylene and perfluorovinyl ether (e.g. PMVE, PPVE-1, PPVE-2 or a combination of PPVE-1 and PPVE-2).

The fluoropolymers that can be produced with the process of the invention are generally amorphous or semicrystalline fluoropolymers. A fluoroelastomer is generally a fluoropolymer having elastomeric properties upon curing and will generally not display a melting peak or will have a very minor melting peak, i.e. the fluoroelastomer will generally have little or no crystallinity. Fluorothermoplasts are polymers that generally have pronounced melting peak and that generally have crystallinity. The fluorothermoplasts that can be produced according to this invention will generally be melt processable, i.e. they will typically have a melt flow index of at least 0.1 g/10 min. as measured with a support weight of 5 kg and a temperature of 265° C. as set out in the examples below. Whether the particular fluoropolymer produced is a fluorothermoplast or fluoroelastomer, depends on the nature and amounts of the monomers from which the fluoropolymer is derived as is well known to those skilled in the art.

Fluorothermoplasts

Fluorothermoplasts that can be produced with the process of the present invention generally will have a melting point between 60° C. and 250° C., preferably between 60° C. and 200° C. and most preferably below 170° C. Particularly desirable fluorothermoplasts that can be produced with the process of this invention include copolymers of TFE and VDF, copolymers of VDF and HFP, copolymers of TFE, E and HFP and copolymers of TFE, HFP and VDF.

Fluorothermoplasts that may be produced in connection with the present invention have the advantage of being less susceptible to discoloration, having a decreased amount of extractable compounds and having a high purity. Accordingly, the fluorothermoplasts are generally more easy to process and generally have high temperature resistance, high chemical resistance, same or improved electrical properties, good mold release and reduced amount of smell. Further, the fluorothermoplasts when extruded typically produce less die drool.

The fluorothermoplastic polymers that can be obtained with the process of the present invention can be used in any of the applications in which fluorothermoplasts are typically used. For example, the fluorothermoplasts can be used to insulate wires and cables. To produce a cable or wire insulated with a fluorothermoplast according to the invention, the fluorothermoplast can be melt extruded around a central conductor, e.g. copper wire. A conductive metallic layer may be formed around the extruded fluorothermoplast layer to produce for example a heating cable.

The fluorothermoplastic polymers produced may further be used to make hoses, in particular fuel hoses and pipes and can be used in particular in heat exchange applications. The fluorothermoplasts may also be extruded into a film or into so-called mono filaments which may then subsequently be woven into a woven fabric. Still further, the fluorothermoplasts can be used in coating applications for example to coat outdoor fabric or to make injection molded articles.

Fluoroelastomers

In addition to fluorothermoplasts, the process of the present invention also allows for making fluoroelastomers with desirable and improved properties. In particular, the fluoroelastomers produced will have a higher purity, a lesser amount of extractable compounds, a lesser amount of low molecular weight oligomers which are partially water soluble, will be less susceptible to discoloration, more easy to process and produce less smell. Additionally, the mechanical and physical properties of the fluoroelastomers can be maintained or improved by the process of the invention. For example, a curable fluoroelastomer produced according to the invention may have an improved compression set or improved permeation properties.

Fluoroelastomers that can be produced in connection with the present invention include perfluoroelastomers as well as elastomers that are not fully fluorinated. The fluoroelastomer may include a cure site component, in particular one or more cure sites derived from a cures site monomer (CSM) to provide a curable fluoroelastomer. Specific examples of elastomeric copolymers include copolymers having a combination of monomers as follows: VDF-HFP, VDF-TFE-HFP, VDF-TFE-HFP-CSM, VDF-TFE-PMVE-CSM, TFE-P, E-TFE-PMVE-CSM and TFE-PMVE-CSM.

To obtain a curable fluoroelastomer, a further cure site component may be included in the polymerization reaction to obtain a curable fluoroelastomer. Generally, the cure site component will be used in small amounts, typically in amounts so as to obtain a fluoroelastomer that has between 0.1 and 5 mol % of cure sites, preferably 0.2 to 3 mol % and most preferred 0.5–2 mol %.

The cure site component may comprise a nitrile group-containing cure site monomer. The cure site component can be partially or fully fluorinated. Preferred useful nitrile group-containing cure site monomers include nitrile-containing fluorinated olefins and nitrile-containing fluorinated vinyl ethers, such as depicted below:

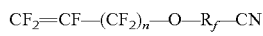

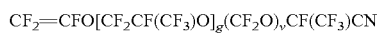

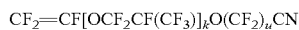

where, in reference to the above formulas: n=1 to 5; 1=2–12; g=0–4; k=1–2; v=0–6; and u=1–4 $R_f$ is a linear or branched perfluoroalkylene or a bivalent perfluoroether group. Representative examples of such a monomer include perfluoro (8-cyano-5-methyl-3,6-dioxa-1-octene), $CF_2$=$CFO(CF_2)_5$ CN, and $CF_2$=$CFO(CF_2)_3OCF(CF_3)CN$.

Alternatively, the cure site component may comprise a fluorinated monomer having a halogen capable of participation in a peroxide cure reaction. Typically the halogen is bromine or iodine. Suitable cure-site components include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1. Examples of other suitable cure site components include $CF_2$=$CFOCF_2CF_2Br$, $CF_2$=$CFOCF_2CF_2CF_2Br$, and $CF_2$=$CFOCF_2CF_2CF_2OCF_2CF_2Br$. Preferably, all or essentially all of these components are ethylenically unsaturated monomers.

A curable fluoroelastomer composition will generally include the curable fluoroelastomer and one or more curatives such as the peroxide and/or one or more catalysts depending on the type of cure sites contained in the curable fluoroelastomer. Suitable peroxide curatives are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2, 5-di(tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of perfluoroelastomer is used.

Another material which is usually blended with the composition as a part of the curative system is a coagent composed of a polyunsaturated compound which is capable of cooperating with the peroxide to provide a useful cure. These coagents can be added in an amount equal to 0.1 and 10 parts per hundred parts perfluoroelastomer, preferably between 2–5 parts per hundred parts fluoroelastomer. Examples of useful coagents include triallyl cyanurate; triallyl isocyanurate; tri(methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bisolefins disclosed in EPA 0 661 304 A1, EPA 0 784 064 A1 and EPA 0 769 521 A1.

When the fluoroelastomer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, aminophenols as disclosed in U.S. Pat. No. 5,677,389, ammonia salts (U.S. Pat. No. 5,565,512), amidoximes (U.S. Pat. No. 5,668,221), imidates, hexamethylene tetramine (urotropin), dicyan diamid, and metal-containing compounds of the formula:

where $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7. Still further ammonia generating compounds are disclosed in PCT 00/09603.

Fluoroelastomers, in particular VDF containing fluoroelastomers, may further be cured using a polyhydroxy curing system. In such instance, it will not be required that the fluoroelastomer includes cure site components. The polyhydroxy curing system generally comprises one or more polyhydroxy compounds and one or more organo-onium accelerators. The organo-onium compounds useful in the present invention typically contain at least one heteroatom, i.e., a non-carbon atom such as N, P, S, O, bonded to organic or inorganic moieties. One useful class of quaternary organo-onium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). One of the most useful polyhydroxy compounds includes aromatic polyphenols such as 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

Prior to curing, an acid acceptor is mixed into a fluoroelastomer composition that comprises a polyhydroxy cure system. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoroelastomer.

A curable fluoroelastomer composition may comprise further additives, such as carbon black, stabilizers, plasticizers, lubricants, fillers, and processing aids typically utilized in fluoroelastomer compounding can be incorporated into the compositions, provided they have adequate stability for the intended service conditions.

Carbon black fillers are typically also employed in elastomers as a means to balance modulus, tensile strength, elongation, hardness, abrasion resistance, conductivity, and processability of the compositions. Suitable examples include MT blacks (medium thermal black) designated N-991, N-990, N-908, and N-907, and large particle size furnace blacks. When used, 1–70 phr of large size particle black is generally sufficient.

Fluoropolymer fillers may also be present in the curable compositions. Generally, from 1 to 50 parts per hundred fluoroelastomer of a fluoropolymer filler is used. The fluoropolymer filler can be finely divided and easily dispersed as a solid at the highest temperature utilized in fabrication and curing of the fluoroelastomer composition. By solid, it is meant that the filler material, if partially crystalline, will have a crystalline melting temperature above the processing temperature(s) of the fluoroelastomer(s). The most efficient way to incorporate fluoropolymer filler is by blending latices; this procedure including various kinds of fluoro polymer filler is described in U.S. application Ser. No. 09/495600, filed 1 Feb. 2000.

The curable compositions can be prepared by mixing the fluoroelastomer, the curatives and/or catalysts, the selected additive or additives, and the other adjuvants, if any, in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. For best results, the temperature of the mixture during the mixing process typically should not rise above about 120° C. During mixing, it is preferable to distribute the components and adjuvants uniformly throughout the gum for effective cure. The mixture is then processed and shaped, for example, by extrusion (for example, in the shape of a hose or hose lining) or molding (for example, in the form of an O-ring seal). The shaped article can then be heated to cure the gum composition and form a cured elastomer article.

Pressing of the compounded mixture (i.e., press cure) usually is conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., oven-cured) at a temperature usually between about 150° C. and about 300° C., typically at about 232° C., for a period of from about 2 hours to 50 hours or more depending on the cross-sectional thickness of the article. For thick sections, the temperature during the post cure is usually raised gradually from the lower limit of the range to the desired maximum temperature. The maximum temperature used is preferably about 300° C., and is held at this value for about 4 hours or more.

The curable fluoroelastomer compositions are useful in production of articles such as gaskets, tubing, and seals. Such articles are produced by molding a compounded formulation of the curable composition with various additives under pressure, curing the part, and then subjecting it to a post cure cycle. The curable compositions formulated without inorganic acid acceptors are particularly well suited for applications such as seals and gaskets for manufacturing semiconductor devices, and in seals for high temperature automotive uses.

The invention will now be further illustrated with reference to the following examples without the intention to limit the invention thereto. All parts and percentages are by weight unless indicated otherwise.

EXAMPLES

Test Methods

The melt flow index (MFI) was carried out according to DIN 53735, ISO 12086 or ASTM D-1238 at a support weight of 5.0 kg and a temperature of 265° C. or 297° C.

alternatively. The MFIs cited here were obtained with a standardized extrusion die of 2.1 mm diameter and a length of 8.0 mm.

Mooney viscosities were determined in accordance with ASTM D1646. Unless otherwise noted, the Mooney viscosity was determined from compositions containing only fluoroelastomer gum incorporating curatives or the final compound using a 1 minute pre-heat and a 10 minute test at 121° C. (ML 1+10@121° C.).

A Monsanito Processability Tester (MPT) was used to evaluate the processability of the fluoropolymer. Hereby, the pressures were determined that were required to extrude each compound at shear rates of 180, 361, 726 and 1446 l/s. The instrument was equipped with a 1.50 mm diameter die of L/D=10, all compounds were tested at 105° C. unless otherwise noted.

Unless otherwise noted, 76×152×2 mm press cured sheets were prepared for physical property testing by pressing at 5 to 7 MPa at 163° C. for 50 minutes. From these press cured sheets, the Tensile Strength at Break and the Elongation at Break were measured according to ASTM D 412. Hardness was determined according to ASTM D2240 Method A. Shore A durometer was used. The compression set was determined according to ASTM 395-89, Method B.

Melting peaks of the fluororesins were determined according to ASTM 4591 by means of Perkin-Elmer DSC 7.0 under nitrogen flow and a heating rate of 10° C./min. The indicated melting points relate to the melting peak maximum.

Solution viscosities of diluted polymer solutions was determined on a 0.2% polymer solution in methylethylketone (MEK) at 35° C. in accordance to DIN 53726. A Connon-Fenske-Routine-Viskosimeter (Fa. Schott, Mainz/Germany) fulfilling ISO/DIS 3105 and ASTM D 2515 was used for the measurements.

Molecular weight distributions were determined by means of Size Exclusion Chromatography (SEC) recorded at 35° C. in tetrahydrofuran-UV grade. The SEC equipment consisted of a Waters 510 isocratic pump, a Perkin Elmer ISS-100 autosampler, a Waters column oven, three gel mixed bed type B columns (10 μm) from Polymer Laboratories (300 mm×7.5 mm), and a Waters 410 RI detector. The instrument was calibrated using 10 narrow distributed polystyrene standard samples (PSS, Mainz/Germany) ranging from 1280 g/mol to 7,300,000 g/mol. The SEC-elugrams calibrated to polystyrene were converted to the molecular weight distribution with the universal calibration procedure using the Mark-Houwink coefficients $\alpha=0.751$ and $K=0.045396$ ml/g.

The latex particle size determination was conducted by means of dynamic light scattering with a Malvern Zetazizer 1000 HSA in accordance to ISO/DIS 13321. Prior to the measurements, the polymer latexes as yielded from the polymerisations were diluted with 0.001 mol/L KCl-solution, the measurement temperature was 20° C. in all cases.

For the evaluation of the vapor transmission (permeation rate) in accordance to ASTM D814, a mixture of 42.5% toluene, 42.5% isooctane and 15% methanol by volume was used as test fluid. Sheets of 0.75–0.90 mm thickness of each polymer composition were press-cured. 3 inch diameter samples were die cut from each sheet. Vapor transmission cups, each with a 2.5 inch opening (4.909 in$^2$ exposed sample surface) and approximately 160 ml capacity, were used and are available from Thwing-Albert Instrument Co. High fluorine, low durometer fluoroelastomer gaskets insured a good seal between sample and the test fluid. The cups were assembled by placing 100 ml of fluid in the cup, a 0.5 mm gasket between the cup and the sample, and a 1.5 mm gasket between the sample and the clamping ring. Because the samples were extensible during testing, a 16-mesh circular screen was placed between the upper gasket and the clamping ring. All tests were conducted at 40° C. for 32 days with the cup maintained in the upright position. The first 7 days of testing, no data were collected in order to allow the sample to reach vapor transmission equilibrium. Then the cups were weighted approximately every other day. The transmission rate was then multiplied by the thickness of the samples in millimeters to normalize each value.

For extractable evaluation, cured elastomer sheets were soaked in methylethylketone (MEK) for 70 hours at 40° C. After this soak period, the cured gum sheet was removed from MEK. MEK was removed from the mother liquor via distillation and the remaining residual was dried for 70 hours at 80° C. and weight.

The content of ammonium perfluorooctanote (APFO) was conducted by means of a colorimetric method described in DIN 38409-H23-1. As modification of DIN 38409-H23-1, Azur B (Fluka) was used as color-indicator for the anionic surfactant instead of Methylen-Blue. A Dr. Lange LP2Winstrument equipped with a 638 nm filter was used for the photometric quantification of the color-complexes.

$^{19}F$ nuclear magnetic resonance (NMR) spectra were recorded with a Bruker Avance 400 (400 MHz) instrument, 3000 scans per measurement were usually applied.

Example 1

A polymerization kettle with a total volume of 47.5 l equipped with an impeller agitator system was charged with 29.0 l deionized water and 3.3 g sodiumdisulfite ($Na_2S_2O_5$). The oxygen free kettle was then heated up to 70° C. and the agitation system was set to 240 rpm. The kettle was charged with 9.7 g dimethylether ($Me_2O$) and 852 g hexafluoropropylene (HFP) to a pressure of 8.1 bar absolute and with 378 g vinylidenefluoride (VDF) to 15.5 bar absolute reaction pressure. The polymerization was initiated by the addition of 130 ml 31% aqueous ammonium peroxodisulfate (APS) solution. As the reaction starts, the reaction temperature was maintained and the reaction pressure of 15.5 bar absolute was maintained by the feeding VDF and HFP into the gas phase with a feeding ratio HFP (kg)/VDF (kg) of 0.653. Additionally, a 10% aqueous solution of sodiumdisulfite ($Na_2S_2O_5$) was continuously fed into the reactor with a feed rate of 50 ml/h. When a total feed of 8040 g VDF was reached in 248 min, the feed of the $Na_2S_2O_5$ solution as well as the feed of the monomers was interrupted by closing the monomer valves. Within 10 minutes, the monomer gas phase was reacted down to a kettle pressure of 5.6 bar. Then the reactor was vented and flushed with $N_2$ in three cycles.

The so-obtained 42.3 kg polymer dispersion with a solid content of 31.5% was recovered at the bottom of the reactor. It consisted of latex particles having 292 nm in diameter according to dynamic light scattering. No coagulum was formed throughout the polymerisation. When the polymer dispersion was vigerously shaken in a reaction tube, no discernible coagulation of the latices took place.

5.0 l of this polymer dispersion was freeze coagulated over night in an refrigerator. After defrosting the material, the so-obtained sponge like raw polymer was washed five times with demineralised water, the polymer was squeezed out and dried for 12 hours in an oven at 130° C. The polymer was translucent and did not show any sign of discoloration, it had a MFI(265/5) of 14.0 grams/10 minutes (per ASTM D 1238) and a solution viscosity of 88 ml/g. The Mooney viscosity of the raw gum was 82 (ML 1+10@121° C.).

Examples 2 to 4

In the following examples 2, 3 & 4, the polymerization equipment as well as similar polymerization conditions as those used in example 1, were used. However, the amount of $Me_2O$ chain transfer agent was varied in examples 2 to 4. The analytical data of the polymers are summarized in table 1. These examples demonstrate that the polymer melt viscosity could be well controlled by the amount of dimethylether chain transfer agent while maintaining the high polymer yield in short polymerization times.

TABLE 1

|  | Example 2 | Example 3 | Example 4 |
|---|---|---|---|
| amount of chain transfer agent [g] | 5.4 | 12.5 | 17.5 |
| polymerization time [min] | 189 | 248 | 300 |
| solid content [%] | 31.7 | 31.6 | 31.7 |
| latex particle diameter [nm] | 306 | 276 | 244 |
| MFI(297/5) [g/10'] | 0.93 | 44 | 145 |
| solution viscosity, [ml/g] | 118 | 68 | 54 |
| ML 1 + 10 @ 121° C. | 122 | 47 | 21 |

The fluoropolymer of Example 3 was compared with a prior art fluoropolymer in terms of molecular weight distribution (MWD) as resulted by size exclusion chromatography (SEC). The comparative fluoropolymer (comparative example 1) was a $VDF_{78}/HFP_{22}$-copolymer prepared as disclosed in U.S. Pat. Nos. 5,106,911, 5,464,904 and 5,710,217 and had a similar chemical composition as well as the similar molecular weight (solution viscosity: 67 ml/g; ML 1+10@121° C.: 50) as the polymer of Example 3 above.

The results from the SEC analysis are reported in Table 2. As indicated by the polydispersity index $M_w/M_n$ shown in Table 2, the MWD of the polymer of Example 3 is noticeably narrower than the polymer of comparative example 1. Especially the low molecular weight fronting of the MWD (low molecular weight fractions) was greatly reduced. This feature of the polymerisation process of the invention is of great advantage for any application with high requirements regarding low extractable amounts of the final articles (e.g. semiconductor industry).

TABLE 2

|  | Comp. Example 1 | Example 3 |
|---|---|---|
| Solution viscosity [ml/g] | 67 | 68 |
| ML 1 + 10 @ 121° C. | 50 | 47 |
| $M_w$ [kg/mol] | 62.2 | 64.7 |
| $M_w/M_n$ | 3.70 | 2.55 |
| Fraction below 1000 g/mol [%] | 0.4 | not detectable |
| Fraction below 2000 g/mol [%] | 1.4 | <0.1 |
| Fraction below 5000 g/mol [%] | 5.4 | 1.9 |

Example 5

The fluoropolymer of Example 2 was tested for its performance as a polymer melt processing additive. The performance of the fluoropolymer example 2 to eliminate the melt fracture and to reduce the gate pressure was compared to the $VDF_{78}/HFP_{22}$-copolymer as described in U.S. Pat. Nos. 5,106,911, 5,464,904 and 5,710,217. This prior art polymer (comparative example 2) has nearly the same solution viscosity (115 ml/g, MEK@35° C.) as the polymer of example 2.

The polyolefin used for the test was a commercially available butene modified linear low density polyethylene (LLDPE from ExxonMobil) with MFI(190/2.16) of 0.7 g grams/10 minutes (per ASTM D 1238) (host resin). Prior to extrusion, a masterbatch of the fluoropolymer was compounded to 2 wt % additive concentration in a carrier resin (LLDPE from ExxonMobil) with MFI(190/2.16) of 2.8 grams/10 minutes (per ASTM D 1238). Sufficient tumbling provided the blending of the LLDPE host resin with the LLDPE carrier resin, the so-obtained concentration of the fluoropolymer in the LLDPE was 400 ppm. The extrusion experiments were carried out on a lab scale Collin blown film line of the following components:

| Motor: | performance 16 kW | |
| Screw: | sections 5/10/10 | compression ration: 2.73 |
|  | diameter: 45 mm | length: 25 × D |
| Die: | diameter: 50 mm | gap: 0.6 mm, dual lip air ring |
| Tower: | Height: 3.14–4.44 m | bubble stabilization cage |

With a screw speed of 46 rpm the extruder output was 11 kg per hour, the temperature profile was the following:

| zone 1: | 205° C. |
| zone 2: | 205° C. |
| zone 3: | 210° C. |
| zone 4: | 220° C. |
| die: | 205° C. |

A baseline condition was established by running the host resin formulation for at least 60 minutes. The extruder gate pressure, melt temperature, and the condition of the film were recorded at this time. A full set of extrusion conditions were recorded every 5 minutes. Once the baseline for the resin to be evaluated was established, the resin containing 400 ppm of fluoropolymer (blend resin of carrier and host resin) was charged to the extruder and the time was recorded. At 5 minutes intervals a film sample was taken and all extrusion conditions were recorded. If melt fracture was reduced to 0 percent in 60 minutes, the data point was complete. If not, the fluoropolymer level was increased by 100 ppm and the process was repeated for another 60 minutes. This process was continued until melt fracture was completely eliminated. The level of fluoropolymer required to achieve this point was recorded.

The results are summarized in Table 3.

TABLE 3

|  | Comp. Example 2 (solution viscosity: 115 ml/g) | | Example 5 (solution viscosity: 118 ml/g) | |
|---|---|---|---|---|
| Time [min] | gate pressure [bar] | melt fracture [%] | gate pressure [bar] | melt fracture [%] |
| 0 | 328 | (100) | 329 | (100) |
| 5 | 321 | (100) | 323 | 100 |
| 10 | 318 | 100 | 307 | 89 |
| 15 | 314 | 78 | 278 | 37 |
| 20 | 302 | 44 | 265 | 29 |
| 25 | 283 | 28 | 250 | 17 |
| 30 | 263 | 23 | 241 | 13 |
| 35 | 250 | 18 | 236 | 8.8 |
| 40 | 241 | 17 | 231 | 7.4 |
| 45 | 232 | 16 | 227 | 5.4 |

TABLE 3-continued

|  | Comp. Example 2 (solution viscosity: 115 ml/g) | | Example 5 (solution viscosity: 118 ml/g) | |
|---|---|---|---|---|
| Time [min] | gate pressure [bar] | melt fracture [%] | gate pressure [bar] | melt fracture [%] |
| 50 | 226 | 14 | 224 | 4.8 |
| 55 | 222 | 9.3 | 221 | 3.6 |
| 60 | 220 | 8.9 | 218 | 3 |
| 65 | 215 | 6.4 | 218 | 2.2 |
| 70 | 214 | 6 | 214 | 2 |
| 75 | 211 | 5.4 | 212 | 1.3 |
| 80 | 210 | 4.8 | 210 | 0.96 |
| 85 | 209 | 3.8 | 209 | 0.64 |
| 90 | 207 | 2.9 | 208 | (0.64) |
| 95 | 205 | 2.2 | 208 | (0.53) |
| 100 | 204 | 1.8 | 207 | (0.48) |
| 105 | 203 | (1.2) | 206 | (0.43) |
| 110 | 203 | (0.63) | 206 | (0.05) |
| 115 | 203 | (0.27) | 205 | (0) |
| 120 | 203 | (0.14) | 205 | (0) |
| 125 | 203 | (0) | 205 | (0) |

When the melt fracture elimination data of Table 2 (Y-axis in log scale) were plotted versus the extrusion time (X-axis in linear scale), the following linear approximation functions could be obtained (the data in brackets were not included in this consideration):

Comparative Fluoropolymer Example:

$\log\{\text{melt fracture [\%]}\} = 2 - 0.0174 \times t[\min]$ (correlation coefficient: $r^2 = 0.97$)

Fluoropolymer Example 2:

$\log\{\text{melt fracture [\%]}\} = 2 - 0.0258 \times t[\min]$ (correlation coefficient: $r^2 = 0.98$)

As can be seen from the slopes of the two regression functions above, the fluoropolymer of Example 2 clears the melt fracture of LLDPE by a factor of 1.48 (48%) faster than the prior art material with the same chemical composition and a comparable molecular weight. This example demonstrates that fluoropolymers produced via the process of this invention exhibit a better performance as a melt processing additive than fluoropolymers produced via prior art polymerisation processes.

Comparative Example 3

As a comparative example to example 6 (see below), the following polymer was prepared according to the procedure:

A fluoroelastomer precursor was prepared in the form of a latex ("Latex 1") by aqueous emulsion polymerization. A polymerization kettle with a total volume of 47.5 l equipped with an impeller agitator system was charged with 29 l deionized water, 118.6 g hexamethyldisilane chain transfer agent and 80 g FC-128 fluorosurfactant ($C_8F_{17}SO_2N(C_2H_5)$ $CH_2COO^-K$ $^+$salt of 3M Company). In three subsequent cycles, the kettle was degassed and subsequently charged with nitrogen to assure that all oxygen had been removed. The kettle was then heated up to 71° C. and the agitation system was set to 240 rpm. The vessel was charged with hexafluoropropylene (HFP) to 4.34 bar absolute, with vinylidenefluoride (VDF) to 7.88 bar absolute and with tetrafluoroethylene (TFE) to 9.5 bar absolute reaction pressure. The polymerization was initiated by the addition of 109 g ammonium peroxodisulfate (APS) dissolved in water. As the reaction starts, the reaction pressure of 9.5 bar absolute was maintained by feeding TFE, VDF and HFP into the gas phase with a feeding ratio TFE (kg)/VDF (kg) of 0.705 and HFP (kg)/VDF(kg) of 1.185. The reaction temperature of 71° C. was also maintained. After feeding 3.96 kg VDF in a total reaction time of 6.5 hours, the monomer feed was interrupted and the monomer valves were closed. The reactor was vented and flushed with $N_2$ in three cycles. The thus obtained 40.4 kg polymer dispersion with a solid content of 28.3% was recovered at the bottom of the reactor, it consisted of latex particles having 92 nm in diameter according to dynamic light scattering. 100 ml of this polymer dispersion was coagulated by adding it drop-wise to an aqueous $MgCl_2$ solution with agitation, after which it was de-watered and washed three times with deionized water (60–70° C.). The polymer was dried overnight at 130° C. in an air circulating oven. The polymer had the appearance of a brown syrup and showed a solution viscosity of 14 ml/g.

A second fluoroelastomer precursor was prepared in the form of a latex ("Latex 2") by aqueous emulsion polymerization in the same reactor as for the preparation of "Latex 1" using 29 l deionized water and 160 g FC-128 fluorosurfactant. No chain transfer agent was utilized in this polymerization. In three subsequent cycles, the kettle was degassed and subsequently charged with nitrogen to assure that all oxygen had been removed. After heating up the kettle to 71° C., setting the agitation system to 240 rpm and degazing and charging with nitrogen in three cycles, the kettle was charged with hexafluoropropylene (HFP) to 4.21 bar absolute, with vinylidenefluoride (VDF) to 7.34 bar absolute and with tetrafluoroethylene (TFE) to 8.8 bar absolute reaction pressure. The polymerization was initiated by the addition of 21 g ammonium peroxodisulfate (APS) dissolved in water. As the reaction started, reaction temperature of 71° C. as well as the reaction pressure of 8.8 bar absolute was maintained by feeding TFE, VDF and HFP into the gas phase with a feeding ratio TFE (kg)/VDF (kg) of 0.705 and HFP (kg)/VDF (kg) of 1.185. After feeding 3.96 kg VDF in a total reaction time of 8.0 hours, the monomer feed was interrupted and the monomer valves were closed. The reactor was vented and flushed with $N_2$ in three cycles. The thus obtained 40.3 kg polymer dispersion with a solid content of 28.2% was recovered at the bottom of the reactor and 85 g of wet coagulate was removed from the dispersion via filtration of the dispersion through a filter with 80 μm mesh size. The dispersion consisted of latex particles having 104 nm in diameter according to dynamic light scattering. 100 ml of this polymer dispersion was worked up the same way as Latex 1, the raw polymer had a nearly white appearance and showed a solution viscosity of 108 ml/g.

Latex 1 and Latex 2 were blended undiluted such that the solid polymers were in the ratio of 50:50 by weight. The latex was coagulated by adding it drop-wise to an aqueous $MgCl_2$ solution with agitation, after which it was de-watered and washed three times with deionized water (60–70° C.). The polymer was dried overnight at 130° C. in an air circulating oven. The raw polymer had a slightly discolored appearance and showed a solution viscosity of 59 ml/g. As shown by size exclusion chromatography (SEC), the polymer exhibited a distinct bimodal molecular weight distribution (MWD): The separate peak at low molecular weights had a mass average molecular weight of $M_w = 10.700$ g/mol, a polydispersity of $M_w/M_n = 2.2$ and an area of 55% of the total MWD. The separate peak at high molecular weights had a mass average molecular weight of $M_w = 200.000$ g/mol, a polydispersity of $M_w/M_n$=1.9 and an area of 45% of the total MWD. The overall polydispersity of the sample was $M_w/M_n$=11.2.

Example 6

A polymerization kettle with a total volume of 47.5 l equipped with an impeller agitator system was charged with 29 l deionized water. The oxygen-free kettle was then heated up to 70° C. and the agitation system was set to 240 rpm. The kettle was charged with 0.6 g methyl tertiary butyl ether (MTBE) and with 1210 g hexafluoropropylene (HFP) to 10.25 bar absolute, with 176 g vinylidenefluoride (VDF) to 13.55 bar absolute and with 190 g tetrafluoroethylene (TFE) to 15.5 bar absolute reaction pressure. The polymerization was initiated by the addition of 40 g ammonium peroxodisulfate (APS) dissolved in water. As the reaction starts, the reaction pressure of 15.5 bar absolute was maintained by the feeding TFE, VDF and HFP into the gas phase with a feeding ratio TFE (kg)/VDF (kg) of 0.705 and HFP (kg)/VDF (kg) of 1.185. The reaction temperature of 70° C. was also maintained.

After feeding 2.51 kg VDF (corresponds to 50% monomer target feed after 62 min polymerization time), a portion of 54 g MTBE chain transfer agent was added into the vessel which was resulting in a drastic declination of the monomer uptake. The monomer feed was maintained for another polymerization period of 200 min, until the monomer feed 5.01 kg VDF was completed. The monomer feed interrupted and the monomer valves were closed. Within 10 min, the monomer gas phase had reacted down to a vessel pressure of 8.4 bar; then the reactor was vented and flushed with $N_2$ in three cycles.

The so-obtained 43.4 kg polymer dispersion with a solid content of 33.2% was recovered at the bottom of the reactor and it consisted of latex particles having 274 nm in diameter according to dynamic light scattering.

5.0 l of this polymer dispersion was freeze coagulated over night in an refrigerator. After defrosting the material, the so-obtained sponge-link raw polymer was washed five times with demineralized water, the polymer was squeezed out and dried for 12 h in an oven at 130° C. The polymer was transparent and did not show any sign of discoloration, it had a MFI(265/5) of 12.8 g/10' and a solution viscosity of 68 ml/g. As resulted by size exclusion chromatography (SEC), the polymer exhibited a distinct bimodal molecular weight distribution (MWD): The separate peak at low molecular weights had a mass average molecular weight of $M_w$=13.600 g/mol, a polydispersity of $M_w/M_n$=2.2 and an area of 53% of the total MWD. The separate peak at high molecular weights had a mass average molecular weight of $M_w$=279.000 g/mol, a polydispersity of $M_w/M_n$=1.9 and an area of 47% of the total MWD. The overall polydispersity of the sample was $M_w/M_n$=12.3.

100 parts of the polymer were mixed on a two roll mill with the following ingredients:
- 5.94 (mmhr) Bisphenol AF
- 0.54 (mmhr) of the following phosphonium complex $(C_4H_9)_3P^+CH_2CH(CH_3)OCH_3{}^-OC_6 H_4C(CF_3)_2 C_6H_4$ OH which is tributylmethoxy propyl phosphonium chloride prepared from tributylphosphine (available from Cytec) allylchloride and methanol and then reacting with the sodium salt of Bisphenol AF.
- 1.03 (mmhr) of a further complex which is a complex prepared by reacting tributylmethoxy propyl phosphonium chloride with the sodium salt of perfluoroctyl-n-methylsulfonamide.

After measuring the Mooney viscosity of the curative blend ("ML 1+10@121° C. incorporated cure"), the following other compounding ingredients were added: 3 g per hundred gram (phr) magnesium oxide (Elastomag 170 from Morton International) and 6 phr calcium hydroxide and 13 phr carbon black (N762). The composition was prepared in the form of individual sheets measuring 76×152×2 mm by pressing at 5–7 MPa at 165° C. for 50 min. The same curing procedure was conducted on a comparative prior art polymer disclosed in U.S. Pat. Nos. 5,256,745 & 5,208,305 (comparative example 3). Finally, both cured compounds were tested and compared for various properties according to the test protocols set forth above. The test results are reported in Table 4.

TABLE 4

| | comp. ex. 3 | Example 6 |
|---|---|---|
| MFI(265/5), raw gum [g/10'] | 17.9 | 11.5 |
| Solution viscosity, MEK @ 35° C. [ml/g] | 56 | 68 |
| $M_w/M_n$ (SEC measurement) | 11.2 | 12.4 |
| ML 1 + 10 @ 121° C. incorporated cure | 31 | 32 |
| ML 1 + 10 @ 121° C. compound | 57 | 59 |
| Physical properties of press cured sheet | | |
| Durometer, shore A | 68 | 65 |
| Peak Stress [MPa] | 9.9 | 10.3 |
| Peak Strain % | 295 | 256 |
| 100% Modulus [MPa] | 2.8 | 3.0 |
| Processing Evaluation (MPT), 105° C. | | |
| Zone 1, 180 $s^{-1}$ [MPa] | 23.4 | 21.1 |
| Zone 2, 361 $s^{-1}$ [MPa] | 25.5 | 23.2 |
| Zone 3, 723 $s^{-1}$ [MPa] | 28.2 | 25.9 |
| Zone 4, 1446 $s^{-1}$ [MPa] | 32.7 | 28.6 |
| Processing Evaluation (MPT), 120° C. | | |
| Zone 1, 180 $s^{-1}$ [MPa] | 19.2 | 19.1 |
| Zone 2, 361 $s^{-1}$ [MPa] | 21.7 | 21.5 |
| Zone 3, 723 $s^{-1}$ [MPa] | 24.5 | 23.0 |
| Zone 4, 1446 $s^{-1}$ [MPa] | 28.1 | 25.7 |
| Compression set of, cured sheet [%] | 19 | 5 |
| Wt % Extractables | 13.6 | 5.2 |
| Permeation, CM14 @ 40° C. [g · mm/$m^2$ · d] | 55 | 30 |

This example demonstrates that the polymerization process of the invention can conveniently be used to generate bimodal molecular weight distributions in only one single-step polymerization with significantly improved properties.

Comparative Example 4

As a comparative example to example 7, a prior art polymer was prepared as follows:

A polymerization kettle with a total volume of 186.1 l equipped with an impeller agitator system was charged with 119.8 l deionized water, 55.4 g oxalic acid, 388 g ammonium oxalate, 268 g diethylmalonate and 1660 g 30% ammonium perfluorooctanoic acid solution (APFO). The oxygen-free kettle was then heated up to 43° C. and the agitation system was set to 210 rpm. The kettle was charged with 4000 g hexafluoropropylene (HFP) to 6.3 bar absolute, with 1210 g vinylidenefluoride (VDF) to 11.9 bar absolute and with 1170 g tetrafluoroethylene (TFE) to 15.0 bar absolute reaction pressure. The polymerization was initiated by 50 ml of a 1.34% aqueous potassium permanganate solution. As the reaction started, the reaction pressure of 15.0 bar absolute was maintained by the feeding TFE, VDF and HFP into the gas phase with a feeding ratio VDF (kg)/TFE (kg) of 0.862 and HFP (kg)/TFE (kg) of 0.472. Additionally, a 1.34% aqueous potassium permanganate solution was continuously fed into the reactor with a feed rate of 110 ml/h. The reaction temperature of 43° C. was also maintained.

After feeding 26.6 kg TFE the monomer feed was interrupted (after 275 min polmyerization time) and the monomer valves were closed. The so-obtained 178.7 kg polymer dispersion with a solid content of 32.2% was recovered at the bottom of the reactor and it consisted of latex particles having 92 nm in diameter according to dynamic light scattering. This polymer was passed through a glass column containing DOWEX 650C cation exchange resin (Dow Chemical Co.). After that the dispersion was pressurized in a high pressure homogenizer (APV-Gaulin GmbH, Luebeck/Germany) to 300 bar and then expanded through slits, whereupon the dispersion coagulated almost quantitatively to form a slurry. The slurry was pumped to a storage tank and diluted with water, after which it was pumped to a continuous vacuum filter press (Pannevis), washed and de-watered. The de-watered composition was dried in an oven at 70° C. for 15 hours under vacuum.

The dried polymer showed a melting point maximum of 120° C. and a heat of fusion of 6.8 J/g. The polymer had a MFI(265/5) of 22 g/10 min. As shown by size exclusion chromatography, the polymer had a mass average molecular weight of $M_w$=77200 g/mol and the polydispersity index was $M_w/M_n$=1.81. The fraction of molecular weights smaller than 2000 g/mol made 0.1% of the total polymer and the fractions with molecular weights below 5000 g/mol made 0.5% of the total polymer.

2 g of the fluoropolymer resin were completely dissolved in 18 g tetrahydrofurane. Then the polymer was reprecipitated by the dropwise addition of the solution into 80 g methanol under vigorous stirring. After removing the precipitated polymer, the methanol/THF liquid was analyzed in terms of its residual amount of APFO according to the colorimetric method as described above. The analysis yielded a total APFO residual content 88 ppm AFPO in the polymer.

Example 7

A polymerization kettle with a total volume of 47.5 l equipped with an impeller agitator system was charged with 29 l deionized water, 2.0 g oxalic acid and 12.0 g ammonium oxalate. In three subsequent cycles, the kettle was degassed and subsequently charged with nitrogen to assure that all oxygen has been removed. The kettle was then heated up to 60° C. and the agitation system is set to 240 rpm. The kettle is charged with ethane to 1.4 bar absolute, 969 g hexafluoropropylene (HFP) to 8.20 bar absolute, with 250 g vinylidenefluoride (VDF) to 12.62 bar absolute and with 400 g tetrafluoroethylene (TFE) to 15.5 bar absolute reaction pressure. The polymerization was initiated by 25 ml of a 1.3% aqueous potassium permanganate solution. As the reaction starts, the reaction pressure of 15.5 bar absolute was maintained by the feeding TFE, VDF and HFP into the gas phase with a feeding ratio VDF (kg)/TFE (kg) of 0.821 and HFP (kg)/TFE (kg) of 0.424. Additionally, a 1.3% aqueous potassium permanganate solution was continuously fed into the reactor with a feed rate of 60 ml/h. The reaction temperature of 60° C. was also maintained.

After feeding 3260 g TFE the monomer feed was interrupted and the monomer valves were closed. Then the reactor was vented and flushed with $N_2$ in three cycles. The so-obtained 36.3 kg polymer dispersion with a solid content of 20% was recovered at the bottom of the reactor, it consisted of latex particles having 387 nm in diameter according to dynamic light scattering. This polymer was worked up the same way as described in comparative example 5.

The dried polymer showed a melting point maximum of 118° C. and a heat of fusion of 6.5 J/g. The polymer was transparent and had a MFI(265/5) of 17.9 g/10 min. As indicated by a SEC analysis, the polymer had a mass average molecular weight of $M_w$=79.400 g/mol and a symmetrical Gaussian molecular weight distribution with a polydispersity index of $M_w/M_n$=1.59. In comparison to the fluoropolymer of comparative example 4, the low molecular weight fractions of the fluororesin of Example 7 is greatly reduced. The fraction of molecular weights smaller than 5000 g/mol makes only 0.2% of the total polymer, but any fractions with molecular weights below 2000 g/mol are indetectable with the SEC equipment.

On the one hand, this example demonstrates that also partially crystalline polymers can be produced with the environmentally friendly process of the invention. On the other hand this example demonstrates that the process of the invention provides fluororesins with greatly reduced amounts of fluorinated low molecular weight components in a convenient and economically feasible way.

Example 8

A polymerization was conducted using the same polymerisation vessel was well as equivalent conditions as used in Example 7. In deviation of Example 7, 21 g dimethylether was used as chain transfer agent instead of 1,4 bar partial pressure of ethane The polymer work-up was conducted analogous to Example 7. The dried polymer also showed a melting point maximum of 118° C., but the MFI(265/5) was 89 g/10'. The molecular weight distribution (MWD) of this polymer showed essentially the same symmetrical shape as obtained for Example 7, the MWD was only horizontally shifted to lower molecular weights ($M_w$=56.100 g/mol and $M_w/M_n$=1.57).

A number of potential chain transfer agents were tested for their ability to dissolve the fluoropolymer of this example 8. The results are in the following table 5:

TABLE 5

| Chain transfer agent | solubility |
| --- | --- |
| ethane | not tested/gas |
| diethyl ether | insoluble |
| methy-t-butylether | insoluble |
| dimethyl ether | not tested/gas |
| ethylacetate | soluble |
| 2-butanone | soluble |
| tetrahydrofurane | soluble |
| acetone | soluble |
| dimethylacetamide | soluble |
| pyridine | insoluble |
| N-methylpyrolidone | soluble |
| dimethylformamide | insoluble |
| diethylmalonate | soluble |
| n-pentane | insoluble |

As shown in the above table, diethylmalonate readily dissolves the fluoropolymer. As shown in comparative example 6 below, diethylmalonate results in a high amount of water-soluble fluorinated compounds.

Comparative Example 6

A polymerization was conducted using the same polymerisation kettle as well as equivalent conditions as used in Example 3. In deviation of Example 3, diethylmalonate (DEM) was used as chain transfer agent instead of 12,5 g dimethylether. 86 g of DEM was needed to obtain a $VDF_{78}/$ HFP$_{22}$-copolymer having the same molecular weight characteristics as summarised in Table 1 (MFI, solution viscosity and Mooney viscosity). 100 ml of polymer dispersion was freeze coagulated over night in an refrigerator. After defrosting the material, the aqueous mother liquor was separated from the sponge-linke raw polymer. The aqueous phase was analysed in terms of the content of fluorinated water soluble components by means of $^{19}$F NMR. 0,14% of trifluoroethanol (F$_3$C—CH$_2$OH) was added to the aqueous phase as internal standard. The same was done for the polymer dispersion of Example 3. The obtained signal intensities are summarised in Table 6.

TABLE 6

| $^{19}$F signal location | signal intensity for the aqueous phase of Example 3 | signal intensity for the aqueous phase of comp. example 6 |
| --- | --- | --- |
| −74 ppm | 1.0 | 6.7 |
| −80 ppm | 0.6 | 0.9 |
| −90 ppm (triplett) | 2.9 | 8.1 |
| −113 ppm | 1.9 | 20.6 |
| −145 | 0.9 | 0.9 |
| sum of all detecteable $^{19}$F*) | 7.3 | 37.2 |
| −74.4 ppm (internal standard F$_3$C—CH$_2$OH | 20.5 | 20.5 |

*)signal of internal standard (F$_3$C—CH$_2$OH) not considered

As indicated by the $^{19}$F NMR signals summarised in Table 5, the aqueous phase of comparative example 6 contains about 5 fold more water soluble fluorine containing components as compared to Example 3 (compare the values of "sum of all detecteable $^{19}$F"). Based on this data, the corresponding amount of water soluble fluorinated compounds in comparative example 6 was calculated to be about 0.49% based on the total amounts of monomers fed to the polymerization. The amount of water soluble fluorinated compounds in example 3 was calculated to be about 0.09%. This example therefore demonstrates that the generation of water-soluble fluorinated compounds is greatly reduced if dimethylether or MTBE is used as chain transfer agent instead of established chain transfer agent as for instance diethylmalonate or ethyl acetate, thereby minimizing the amount of extractable compounds in the resulting fluoropolymer.

Diethylmalonate and ethyl acetate chain transfer agent have been demonstrated to be solvents for some semi-fluorinated polymers (e.g. TFE$_{39}$/HFP$_{11}$/VDF$_{50}$-terpolymer), whereas dimethylether and methyl-t-butylether scarcely show affinity to these semi-fluorinated polymers.

The invention claimed is:

1. Method of making a fluoropolymer comprising repeating units derived from at least one first and at least one second monomer that are different from each other, said first monomer being a fluoroolefin selected from tetrafluoroethylene, vinylidene fluoride, or combinations thereof and said second monomer being at least one comonomer selected from the group consisting of vinylfluoride, a perfluoroalkyl vinyl monomer, ethylene, propylene, fluorinated allyl ethers, fluorinated vinyl ethers and vinylidene fluoride, said method comprising an aqueous emulsion polymerization of said first and second monomers in absence of added surfactant, said method being characterized in that said aqueous polymerization is carried out in the presence of a chain transfer agent or mixture of chain transfer agents selected from the group consisting of alkanes and dialkyl ethers.

2. Method according to claim 1 wherein a mixture of an oxidizing agent and a reducing agent is used to start the polymerization and wherein there is further added during the polymerization either the oxidizing agent or the reducing agent but not both.

3. Method according to claim 1 wherein the polymerization is initiated using a persulfate.

4. Method according to claim 1 wherein said fluoropolymer is a copolymer selected from the group consisting of a copolymer of vinylidene fluoride and hexafluoropropylene, a copolymer of tetrafluoroethylene and vinylidene fluoride, a copolymer of tetrafluoroethylene and hexafluoropropylene, a copolymer of tetrafluoroethylene and ethylene, a copolymer of tetrafluoroethylene and propylene, a copolymer of tetrafluoroethylene and a perfluorovinyl ether and a copolymer of vinylidene fluoride and a perfluorovinyl ether.

5. Method according to claim 1 wherein said fluoropolymer is a copolymer selected from a copolymer of tetrafluoroethylene, hexafluoropropylene and a perfluorovinyl ether, a copolymer of tetrafluoroethylene, vinylidene fluoride and propylene and a copolymer of tetrafluoroethylene, vinylidene fluoride and hexafluoropropylene.

6. Method according to claim 1 wherein said fluoropolymer further comprises units derived from chlorotrifluoroethylene.

7. Method according to claim 1 wherein said fluoropolymer is a curable fluoroelastomer further comprising a cure site component.

8. Method according to claim 1 wherein said fluoropolymer is a fluorothermoplast that has a melting point of 60° C. to 250° C.

9. Method according to claim 2 wherein said reducing agent is a sulfite, a metabisulfite or a metal ion.

10. Method according to claim 1 wherein said chain transfer agent is dimethyl ether, methyl t-butyl ether or ethane.

11. Method according to claim 1 wherein the dialkyl ethers comprise partially fluorinated ethers of the general structure R$_f$—O—CH$_3$, whereby R$_f$ can be a linear or branched partially or perfluorinated compounds of C$_1$–C$_{10}$.

12. Method according to claim 1 wherein the alkane is methane, ethane, propane, or n-pentane.

13. Method according to claim 1 wherein the polymerization includes at least one fluoroolefin capable of acting as a reducing agent for an oxidizing metal ion and wherein that oxidizing metal ion is used to start the polymerization and wherein said oxidizing metal ion is further added during the polymerization.

14. Method according to claim 13 wherein said oxidizing metal ion derives from a manganate salt.

15. Method according to claim 14 wherein said manganate salt is potassium permanganate.

16. Method according to claim 13 wherein said fluoroolefin is tetrafluoroethylene or vinylidene fluoride.

17. Method according to claim 1 wherein said method is carried out by varying the amount of chain transfer agent during the polymerization so as to produce a multi-modal fluoropolymer.

18. Method according to claim 1 wherein the polymerization conditions do not yield more than 0.4% by weight of water soluble fluorinated compounds relative to the total weight of monomers fed to the polymerization.

19. Method according to claim 1 wherein the method results in an aqueous dispersion having an average polymer particle size of up to 500 nm and wherein the aqueous dispersion exhibits no coagulation or settling.

* * * * *

UNITED STATES PATENT AND TRADEMARK OFFICE
CERTIFICATE OF CORRECTION

PATENT NO. : 7,074,862 B2
APPLICATION NO. : 10/474523
DATED : July 11, 2006
INVENTOR(S) : Harald Kaspar It is certified that error appears in the above-identified patent and that said Letters Patent is hereby corrected as shown below:

Title Page #56
U.S. Patent Documents, Column 2, Line 20, delete "B1" following "6,693,152" and insert -- B2 -- in place thereof.

Column 3
Line 48, delete "fluoropolymner" and insert -- fluoropolymer -- in place thereof.

Column 5
Line 59, delete "nonatluorobutane" and insert --nonafluorobutane -- in place thereof.

Column 9
Line 56, delete "u=1-4$R_f$" and insert -- u=1-4, $R_f$ -- in place thereof.

Column 10
Lines 36-37, delete "norbomene" and insert -- norbornene -- in place thereof.

Signed and Sealed this

Nineteenth Day of September, 2006

JON W. DUDAS
*Director of the United States Patent and Trademark Office*